Nov. 17, 1931.   C. T. BRADY   1,832,475
LAMP
Filed May 31, 1928

Inventor
Charles T. Brady,
By
Attorneys

Patented Nov. 17, 1931

1,832,475

UNITED STATES PATENT OFFICE

CHARLES T. BRADY, OF DETROIT, MICHIGAN

LAMP

Application filed May 31, 1928. Serial No. 281,747.

The present invention pertains to a novel lamp designed for ornamentation in a dwelling and also serviceable for reading, sewing and the like.

The principal object of the invention is to provide a device of this character embodying the characteristic already set forth and further capable of adjustment in determining the amount of useful light to be derived therefrom. In this connection the device comprises essentially an ornamental lamp housing, preferably of open-work metal mounted on a suitable stand or support. Within the housing is contained a suitable light source such as an electric bulb, and the walls of the housing are lined with a transparent material which when illuminated presents an agreeable appearance. A part of the housing adjacent the light is in the form of an adjustable shutter through which bright light may escape from the housing. A lens suited for the particular purposes under consideration is interposed between the light source and the shutter opening.

The housing further contains a hollow frame hingedly mounted therein beneath the lamp. This frame contains a colored screen for giving a different shade of light below the housing. The frame may be swung out of the base of the housing to permit light to pass directly from the light source to the exterior, in case it is desired to have bright light below the housing.

A further object of the invention is to provide a device which emits a light resembling daylight and which is therefore easier on the eyes than the light emitted from the usual incandescent lamp. With this object in view, a magnifying lens is placed in the path of the light issuing from the lamp within the housing, and a suitable filter for absorbing the lower wave lengths is applied to the lens at the side of incidence thereof. This filter tends to reduce the intensity of the light, but this reduction is compensated by the lens which is of a magnifying nature and concentrates and intensifies the filtered light within the useful area.

The invention is fully disclosed by way of example in the following description and in the accompanying drawings, in which—

Reference to these views will now be made by use of like characters which are employed to designate corresponding parts throughout.

Figure 1:
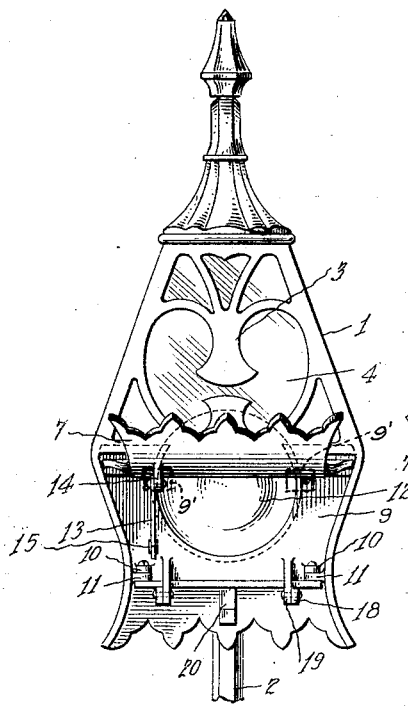
Figure 1 is a front elevation of the device showing the shutter in open position.

The lamp housing 1 is of any desired formation and is supported on a suitable stand 2 which may be a lamp pedestal. In the present instance, the lamp housing is a polygonal enclosure preferably of metal and having open-work sides 3. Behind these sides is secured a transparent material 4 designed to present an agreeable appearance when illuminated. In the top of the housing is provided a lamp socket 5 into which is secured an electric bulb 6 constituting the light source.

A portion of the housing wall adjacent the member 6 is in the form of a shutter 7 consistent with the design of the housing itself and pivotally attached thereto by suitably hinged members 8. A lens frame 9 is secured between the bulb 6 and the shutter opening by means of lugs 10 carried by said frame and secured upon similar lugs 11 extending inwardly from the lateral walls of the housing adjacent the shutter opening. In this frame is supported a lens 12, such as a magnifying lens, held by clips 9' on the frame 9 and intercepting the shutter opening and adapted to modify the light passing therethrough. This lens may be of a nature to modify the light for reading purposes or for any other purposes desired. Preferably a filter 12', suitable for absorbing the lower wave lengths, is placed behind the lens 12 and held in the frame 9 by the clips 9'. The shutter 7 is supported adjustably in open positions by means of a prop 13 pivoted thereto on a lug 14 and passing through a slot 15 in the frame 9. The prop is formed with a series of notches 16 which, in co-operation with the slot, determine the position of the shutter.

In the base of the housing, beneath the light source 6, is supported a hollow frame 17 by means of lugs 18 extending therefrom and pivoted to lugs 19 projecting downwardly from the lower edge of the frame 9. The opposite edge is supported by a flat spring member 20 secured to the adjacent wall of the housing. The frame 17 substantially fills the base opening of the housing and supports a screen or colored glass plate 21. For this purpose the frame is formed on its upper surface with stops 22 on two opposite sides thereof and with retaining clips 23 on the remaining sides.

Figure 2:
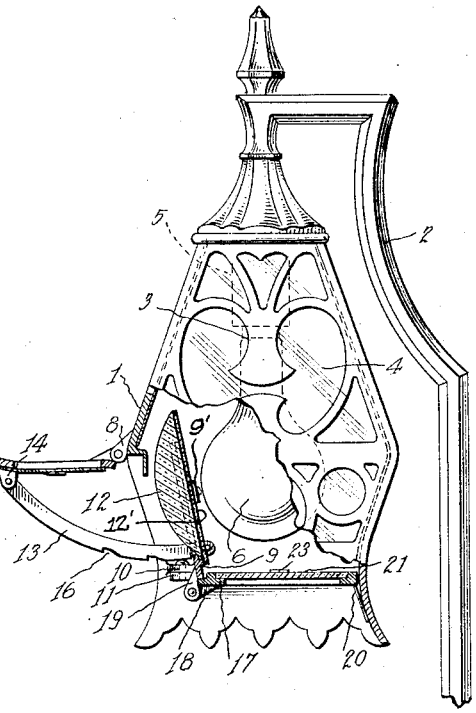
Fig. 2 is an elevation at right angles to Figure 1 and partly in section.
Figure 3:
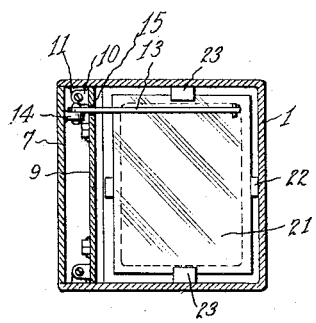
Fig. 3 is a horizontal section.
Figure 4:
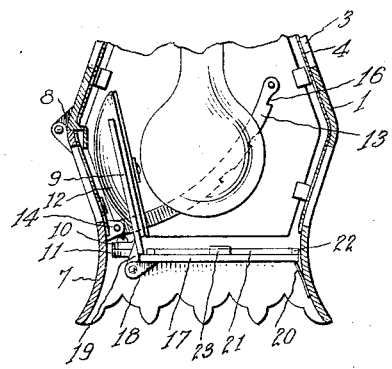
Fig. 4 is a vertical section showing the shutter closed.

When the housing is closed as in Figure 4, a modified or subdued light is seen at the transparent members 4, and the plate 21 is preferably of such a nature as to produce a different form of light at the bottom of the housing. When it is desired to have bright light issue from a side of the housing, the shutter 7 is raised as indicated in Figures 1 and 2, and the angle of the uppermost ray of this bright light may be determined by adjusting the prop in the frame 9 as already described. If bright light is wanted directly below the housing, the spring member 20 is pressed inwardly, whereupon the frame 17 may be swung downwardly to a substantially vertical position.

Although a specific embodiment of the invention has been illustrated and described, it will be understood that various alterations in the details of construction may be made without departing from the scope of the invention as indicated by the appended claims.

What I claim is:—

1. A lamp comprising an ornamental housing, a light source therein, a lens frame supported adjacent said source, a magnifying lens in said frame, a pivotally mounted shutter forming part of said housing adjacent said lens and adapted to cover said lens, and a prop attached to said shutter and slidable through said frame, said prop having notches adapted for selective engagement with said frame.

2. A lamp comprising an ornamental housing, a light source therein, a magnifying lens supported adjacent said source, a pivotally mounted shutter forming part of said housing adjacent said lens and adapted to cover said lens, a hollow frame hinged in said housing beneath said light source, and a transparent member carried by said hollow frame.

3. In combination, a lens frame having an aperture, a magnifying and light-concentrating lens mounted in said aperture, said lens having a plane side of incidence, a filter applied to said side in surface contact therewith and completely covering the same, and clips extending from said frame over said filter whereby to hold said lens in the frame and to hold said filter in contact with said side.

In testimony whereof I affix my signature.

CHARLES T. BRADY.